C. RANDS.
Artificial Millstone.
No. 44,973.
Patented Nov. 8, 1864.
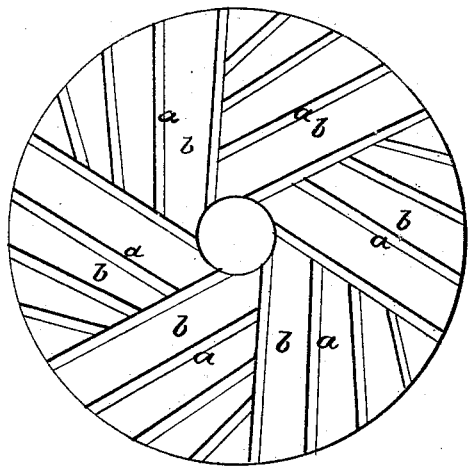

UNITED STATES PATENT OFFICE.

CHRISTOPHER RANDS, OF ENGLEWOOD, NEW JERSEY.

IMPROVED ARTIFICIAL MILLSTONE.

Specification forming part of Letters Patent No. 44,973, dated November 8, 1864.

*To all whom it may concern:*

Be it known that I, CHRISTOPHER RANDS, of Englewood, county of Bergen, and State of New Jersey, have invented a new and Improved Artificial Millstone; and I do hereby declare that the following is a full, clear, and exact description thereof, which will enable others skilled in the art to make and use the same, reference being had to the accompanying drawing, which represents a face view of my invention.

This invention consists in a millstone made of hard or insoluble glass, mixed with corundum or other similar material, and cast or pressed in a suitable mold, or formed in any other desirable manner so that by the action of the corundum the grinding-surface of the stone is prevented from working smooth, and a millstone is obtained which will work for any length of time without being recut or dressed.

The manufacture of my millstones is very simple. I take a sufficient quantity of glass, melt it, and mix it with corundum or similar material or materials, and press the stone either solid or in segments, according to the size of the same. I take green glass by preference, because it is the hardest, and the corundum may be mixed with glass before it is chased or boiled to drive out the air-bubbles.

A stone of this kind presents an even and uniform surface. There are no hard and soft spots, no holes in the surface, and the furrows *a* can be readily produced in the mold, and when once made they will last forever. If two stones of this kind are rubbed together they do not work smooth. The "land" *b* of each surface, by reason of the corundum, will retain sufficient roughness for the purpose of grinding, and grain or other cereals can be ground with a pair of my stones to the finest flour or meal with less trouble and expense than with stones of the ordinary construction.

I am aware that soluble silicates mixed with emery or ground glass have been used for grinding-surfaces, such invention being described in the English patent of Frederick Ransom, dated December 22, 1858, No. 2,929. He states in his patent that he mixes ground glass or emery with the soluble silicate and molds or shapes it into the form of rubbing or grinding surfaces desired, and, when dried, the molded article is subjected to a bright-red heat. In this case the silicate is simply used as a cement to hold the emery or ground glass, the grinding being effected entirely by the emery or ground glass. In my artificial millstone the glass itself forms the grinding-surface, and the corundum is put in simply to prevent the glass from working smooth.

It is obvious that by mixing soluble glass with emery no millstones could be produced which would work for half an hour, and the composition of Mr. Ransom has never, to my knowledge, been used, and, indeed, is not intended for any other purpose but emery-wheels or devices for grinding, polishing, or sharpening articles of metal. My composition would not be applicable for that purpose, and I have intended it merely for artificial millstones.

I claim as new and desire to secure by Letters Patent—

An artificial millstone, produced as herein described, as a new article of manufacture.

CHRISTOPHER RANDS.

Witnesses:
  JAS. B. HALL,
  O. L. TOPLIFF.